United States Patent [19]
Cho et al.

[11] Patent Number: 5,332,690
[45] Date of Patent: Jul. 26, 1994

[54] METHOD OF MAKING AN INTEGRATED OPTICAL PACKAGE FOR COUPLING OPTICAL FIBERS TO DEVICES WITH ASYMMETRIC LIGHT BEAMS

[75] Inventors: Alfred Y. Cho, Summit; Deborah L. Sivco, Warren; Daryoosh Vakhshoori, Scotch Plains, all of N.J.

[73] Assignee: AT&T Bell Laboratories, Murray Hill, N.J.

[21] Appl. No.: 107,541

[22] Filed: Aug. 17, 1993

Related U.S. Application Data

[62] Division of Ser. No. 881,020, May 8, 1992, Pat. No. 5,265,177.

[51] Int. Cl.⁵ .................................... H01L 21/20
[52] U.S. Cl. .................................... 437/126; 437/133; 437/209; 437/225; 385/14; 385/28; 385/130; 385/131
[58] Field of Search ............... 385/14, 28, 31, 43, 385/49, 130, 131; 437/126, 133, 209, 225

[56] References Cited

U.S. PATENT DOCUMENTS

| | | | |
|---|---|---|---|
| 3,994,559 | 11/1976 | Chow | 350/96 |
| 4,601,535 | 7/1986 | Tanaka et al. | 350/96 |
| 4,919,507 | 4/1990 | Evans et al. | 385/130 |
| 5,048,907 | 9/1991 | Wickman et al. | 385/130 |
| 5,127,081 | 6/1992 | Koren et al. | 385/130 |
| 5,140,651 | 8/1992 | Soref et al. | 385/2 |
| 5,163,118 | 11/1992 | Lorenzo et al. | 385/130 |
| 5,208,882 | 5/1993 | Strasser et al. | 385/43 |

FOREIGN PATENT DOCUMENTS 1482996  8/1977  United Kingdom .......... G02B 5/14

OTHER PUBLICATIONS

Patent Abstracts of Japan, vol. 11, No. 68 (P-553) 28 Feb. 1987, and JP-A-61 232 406 (Matsushita Electric (15 Oct. 1986.

Patent Abstracts of Japan, vol. 11, No. 230 (P-599) 28 Jul. 1987 and JP-A-62 043 609 (Matsushita Electric) 25 Feb. 1987.

Shigihara et al., Journal of Applied Physics, "Modal field transforming fiber between dissimilar waveguides," vol. 60, No. 12, 15 Dec. 1986, New York, USA, pp. 4293-4296, FIGS. 1, 2, 7.

Furuya et al., IEEE Transactions on Microwave Theory and Techniques, "A Novel Deposit/Spin Waveguide Interconnection (DSWI) for Semiconductor Integrated Optics," vol. MTT30, No. 10, Oct. 1982, New York, USA, pp. 1771-1777, FIGS. 1, 6.

Zengerle et al., Electronics Letters, "Low-Loss Fibre--Chip Coupling by Buried Laterally Tapered InP/InGaAsP Waveguide Structure," vol. 28, No. 7, 26 Mar. 1992, Stevenage, Herts., GB, pp. 631-632. Zengerle, et al.

Primary Examiner—R. Bruce Breneman
Assistant Examiner—Ramamohan Rao Paladugu

[57] ABSTRACT

This invention embodies an integrated optical package including an optical component having an asymmetric modal output, and a lens integrated with the component for coupling to another optical component having a large modal area. The coupling is achieved by the use of a Polymeric Elongated Waveguide Emulating (PEWE) lens. In the exemplary embodiment the first optical component is a modulator, and the other optical component is an optical fiber. A facet of the modulator is etched by reactive ion etching (REE) which allows integration of the PEWE lens on a common substrate. The lens is manufactured using a polymer film on a dielectric cladding layer. The fabrication relies on the remelt and reflow properties of polymer films to provide a smooth adiabatic mode contraction from a circular (optical fiber) mode ($\approx 6$ $\mu$m in diameter) to a semiconductor mode ($\approx 1$ $\mu$m) over a length of 250 $\mu$m. The PEWE lens permits coupling with an insertion loss of 0.5 dB and 80 percent-coupling efficiency, even though the lens is butt-coupled to a fiber without any external lens. The PEWE lens allows the realization of better than 80 percent direct fiber butt-coupling efficiencies to semiconductor lasers, photodetectors, optical modulators, switches and amplifiers with a simultaneous order of magnitude relaxation of the alignment tolerances typically needed for the coupling of semiconductor devices with single-mode fibers.

5 Claims, 5 Drawing Sheets

METHOD OF MAKING AN INTEGRATED OPTICAL PACKAGE FOR COUPLING OPTICAL FIBERS TO DEVICES WITH ASYMMETRIC LIGHT BEAMS

This is a division of application Ser. No. 07/881,020 filed May 8, 1992 now U.S. Pat. No. 8,265,177.

TECHNICAL FIELD

The present invention relates to an integrated optical package including an optical device with an asymmetric light mode, such as an elliptically-shaped light beam, and a lens for coupling the optical device to an optical fiber.

BACKGROUND OF THE INVENTION

Future network systems may include long-haul optical communication systems, interconnection technologies, two dimensional optical processing, optical computing and others. Semiconductor devices, such as lasers and photodetectors, are already an integral part of optical fiber communication systems. In conjunction with fibers, other semiconductor devices, such as modulators and optical switches, are also likely to be incorporated into the network systems.

Unfortunately, the utility of many such semiconductor devices is hampered by their high fiber insertion loss which at least partially arises from a fundamental mismatch between a typical single-mode fiber with a relatively large cylindrical core and, thus, a large circular modal input or (output) area, and semiconductor devices having smaller modal output (or input) areas and eccentricity ratios greater than 1:1. Losses which arise in coupling light between optical fibers and these devices include those arising from the mismatch of the symmetry of the two modes (circular versus elliptical) as well as the mismatch of the average modal area.

In the past, symmetric hemispherically and hyperbolically shaped microlenses have been fabricated on the end of an optical fiber by means of a pulsed laser beam. See U.S. Pat. No. 4,932,989, issued to H. M. Presby on Jun. 12, 1990 and U.S. Pat. No. 5,011,254 issued to C. A. Edwards and H. M. Presby on Apr. 30, 1991. Such microlenses afford relatively high coupling efficiency for devices, such as lasers, having a symmetric modal output, that is, for devices whose output beam profiles are circular or have ellipticity ratios close to 1:1 i.e., where the divergence of the output beam of the laser is the same or substantially the same along axes parallel and perpendicular to the junction plane of the laser. Use of hyperbolically shaped microlensed fibers has led to greater than 90 percent coupling efficiencies between optical fibers and devices having symmetric modal output. However, the modal asymmetry exhibited by many semiconductor devices requires, for good coupling efficiencies, asymmetric microlenses. There are many lasers which have an elliptical beam structure with ellipticities from about 1:1.5 and even higher, emanating from the laser facet. Use of symmetric microlenses for coupling elliptical light beams to fibers, led to significant decrease in the coupling efficiencies. For example, for such semiconductor devices as laser diodes with reasonable modal asymmetry, e.g. 1:2.5 to 1:3.5, fiber coupling efficiencies of up to 50 percent can be obtained with symmetric microlenses, with 25 to 35 percent being more typical. Since about half of the laser output is not utilized, the kw has to be run at higher currents to yield the same coupled power into fiber than a more efficient coupling scheme could give. Running the laser at higher currents results in greater heat to be dissipated. For example, when the coupling efficiency is at 50 percent, the laser thermal power dissipation is four times greater than at 100 percent coupling efficiency. This affects long-term stability and reliability of the lasers and presents a major obstacle in the development of uncooled laser mode technology. For modulators and switches, where from a system design viewpoint an insertion loss of less than 0.5–1.0 dB is desired, the situation could be more serious. A higher, e.g. 3 dB, insertion loss decreases signal to noise ratio and increases system complexity.

Attempts to increase coupling of fibers to elliptical beams with non-symmetric lenses have been reported in the form of an externally mounted cylindrical lens and a wedge-shaped fiber endface. See M. Saruwatari et al "Semiconductor Laser to Single-Mode Fiber Coupler," *Applied Optics*, Vol. 18, No. 11, 1979, pages 1847–1856 and V. S. Shah et al. "Efficient Power Coupling from a 980 Mn, Broad Area Laser to a Single-Mode Fiber Using a Wedge-Shaped Fiber Endface", *J. Lightwave Technology*, Vol. 8, No. 9, 1990, pages 1313–1318. In the former case the coupling is effected by means of a lens and a cylindrical rod placed between a laser and an optical fiber, and in the latter case an end of the fiber is provided with an enlarged cylindrical portion terminating in a wedge-like shape which approximates a cylindrical lens. In the latter case, a coupling efficiency of 47 percent was obtained. Clearly, what is required for optimum coupling between a device with an elliptical light beam output (or input) area and an optical fiber is a lens which would transform the elliptical beam output of the device to match the circular single-mode fiber mode profile and vice versa.

SUMMARY OF THE INVENTION

This invention embodies an integrated optical package including an optical component having an asymmetric modal output, and a lens integrated with the component for coupling to another optical component having a large modal area. The coupling is achieved by the use of a Polymeric Elongated Waveguide Emulating (PEWE) lens. In the exemplary embodiment the first optical component is a modulator and the other optical component is an optical fiber. A facet of the modulator is etched by reactive ion etching (RIE) which allows integration of the PEWE lens on a common substrate. The lens is manufactured using a polymer film on a dielectric cladding layer. The fabrication relies on the remelt and reflow properties of polymer films to provide a smooth adiabatic mode contraction from a circular (optical fiber) mode ($\approx 6$ $\mu$m in diameter) to a semiconductor mode ($\approx 1$ $\mu$m) over a length of 250 $\mu$m. The PEWE lens permits coupling with an insertion loss of 0.5 dB and 80 percent coupling efficiency, even though the lens is butt-coupled to a fiber without any external lens. The PEWE lens allows the realization of better than 80 percent direct fiber butt-coupling efficiencies to semiconductor lasers, photodetectors, optical modulators, switches and amplifiers with a simultaneous order of magnitude relaxation of the alignment tolerances typically needed for the coupling of semiconductor devices. single-mode fibers.

DETAILED DESCRIPTION

This invention embodies an integrated optical package including a semiconductor device having an elliptical mode output integrated with an elongated optical lens for coupling the device to an optical fiber with a circular mode and vice versa. The package and process steps used in the fabrication of the package are described hereinbelow with reference to the drawings. For illustration purposes, various dimensions of the drawings are not drawn to scale.

Figure 1:
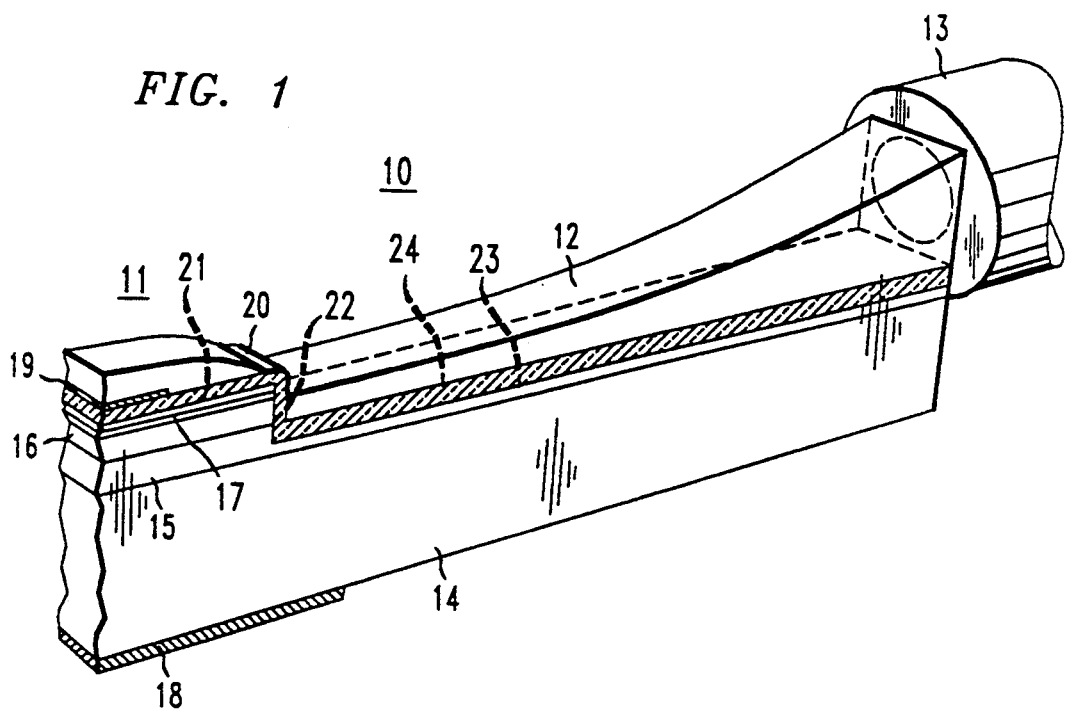
FIG. 1 is a perspective view of an integrated optical package showing a microlens coupling an optical device to an optical fiber.

Shown in FIG. 1 is a schematic perspective view representation of an integrated optical coupling package, 10. Package 10 includes a compound semiconductor device, 11, having an asymmetric, modal output area, and a coupling optical lens, 12, formed integrally with the device and coupling an optical mode output (or input) of the device to an optical fiber 13. Lens 12 is of an organic polymeric material including photoresists and other polymers. For smooth coupling of optical energy fi-om the device to a fiber and vice versa, lens 12 is in the form of an elongated wedge-Mm waveguide. This lens may be referred to as a Polymeric Elongated Waveguide Emulating (PEWE) optical lens.

Typical semiconductor device 11 includes a semiconductor substrate, 14, a bottom cladding layer, 15, an active layer, 16, a top cladding layer 17, and a lower and a top electrodes, 18 and 19, respectively. The device may further include at least one other layer, such as a buffer layer positioned between the substrate and the bottom cladding layer, a highly doped contact layer positioned between the top cladding layer and the top electrode, a capping layer positioned on top of the top cladding or contact layer, and some other layers depending on the construction of the device, as is well-known in the art. Undoped or lightly doped transition layers may also be deposited between the active layer and the cladding layers. The active layer may be a single layer, an alternating multilayer structure, or a structure graded on both sides of the active layer. Such layers are well-known in the art and may vary depending on the device.

Figure 2:
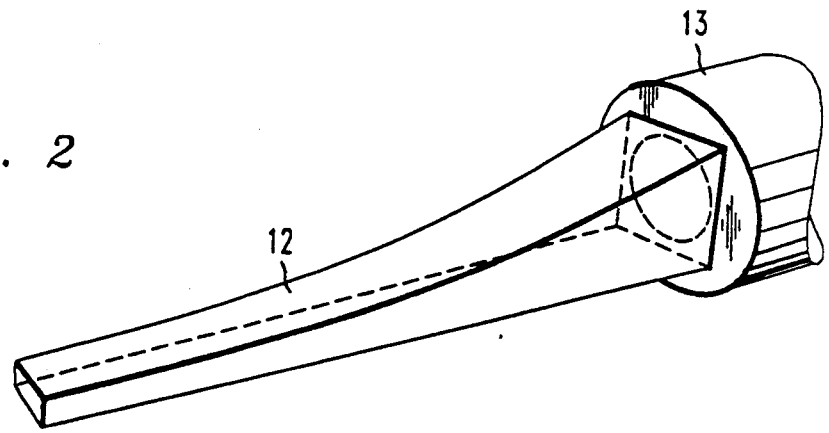
FIG. 2 is a perspective view of the microlens.

A layer, 20, of an optically transparent dielectric material overlays a top surface, 21, of the device, its light-emitting (or light-receiving) facet, 22, and a surface, 23, of the bottom cladding layer 15. Prior to deposition of the dielectric layer, the surface of facet 22 may be coated with a light-reflective coating. Such coatings as AgBr or ZnS, are suitable for this purpose. Top surface 24 of layer 20 is aligned with lower boundary of active layer 16. Lens 12 rests on top surface 24 of layer 20 and abuts that portion of layer 20 which is in contact with facet 22 of the device. Since the lower surface of lens 12 is on surface 24 of layer 20, the bottom of the lens is also aligned with the bottom of active layer 16. To fit the lens to the cross-section of active region 16 and of the optical fiber, the lens is in the form of a truncated wedge. The narrower end of the wedge is aligned with and approximates the cross-sectional area of active region 16, while the wider end of the wedge approximates the cross-section of at least the core of the optical fiber. The face of the lens at the narrow end has a rectangular-to-elliptical cross-section with an asymmetry ratio closely approximating that of the active region. The narrow end of the lens abuts facet 22 of device 11. The opposite face of the lens at the wide end has a square-to-circular or -elliptical cross-section which approximates at least the cross-section of the core of the optical fiber. A perspective view of lens 12 without the dielectric layer and the substrate is shown in FIG. 2. Optical fiber 13 is shown abutting the lens; however, it may be any other optical component with a relatively large modal area, relative to the modal area of the optical device 11.

A number of packages may be produced upon a single compound semiconductor wafer, and then divided out, e.g. by cleaving into single or duplex packages or alternatively, into a parallel multiple of single or duplex packages. A duplex integrated package includes two semiconductor devices 11 integrally produced on the substrate in a back-to-back fashion permitting insertion of an optical radiation from one optical fiber into one device via a related lens, transfer of the radiation from one device to another device, and then coupling of the radiation from said other device into another optical fiber via the related lens.

The production of the integrated optical package begins with a semiconductor structure of the device upon a semiconductor wafer, formed by depositing on the substrate a plurality of different layers by planar technology. The structure, typically includes an active layer placed between a bottom and a top cladding layers but may include other layers as is well-known in the art At least one flat trench is etched in the surface of the semiconductor structure exposing vertical facets 22. The width of each trench between the facets is equal to twice the desired length of the lens. The distance between the trenches is selected to accommodate the length of two devices. Prior to forming the lenses, the etched facet may be coated with a thin and reflective coating, such as AgBr or ZnS. Thereafter, the bottom of each trench, the facet and the upper surface of each device, are coated with a dun layer of an optically transparent dielectric material. The trench is of such depth and the dielectric material is of such thickness that, when the dielectric material is deposited on the bottom of the trench, the upper surface of the dielectric material in the trench is in alignment with the bottom boundary of the active layer in the structure. This assures alignment of the lower surface of the lens resting on the dielectric layer with the bottom boundary of the active layer.

The lens is produced by depositing, on upper surface 24 of dielectric layer 20 in the trench, a layer of an organic polymeric material, selected from photoresists and other polymers, which is optically transmissive and has an index of refraction approximating that of the core of the optical fiber. The organic polymeric material after processing has in a longitudinal cross-section a truncated wedge-like structure the upper surface of which slopes from the wide, optical fiber-mating end to the narrow, device-mating end. The thickness of the organic material is small relative to the length of the lens so that the upper surface of the lens slopes gradually from the wide end to the narrow end. In the preferred embodiment, the upper surface of the lens slopes from about 6-7 $\mu$m at the wide, optical fiber end to about 1 $\mu$m at the device end over a length of about 250 $\mu$m, Thereafter, the organic polymeric material is trimmed laterally, e.g., by plasma etching, to remove any organic polymeric material which is not needed for the transmission of the radiation energy from the device to the fiber and vice versa. The top view of the lens has the shape of a truncated triangle, with the broader base facing the fiber and with the narrower base facing the device. Because of the gentle slope of the wedge, there is little possibility of leakage of the radiation through the unprotected surfaces of the lens. To reduce even this possibility, exposed surfaces of the lens may be coated with a thin layer of dielectric material, such as $SiO_2$ with n=1.47, which could block the leakage. Preferably, the coating material shall have an index of refraction which is lower than the material of the lens.

Figure 3:
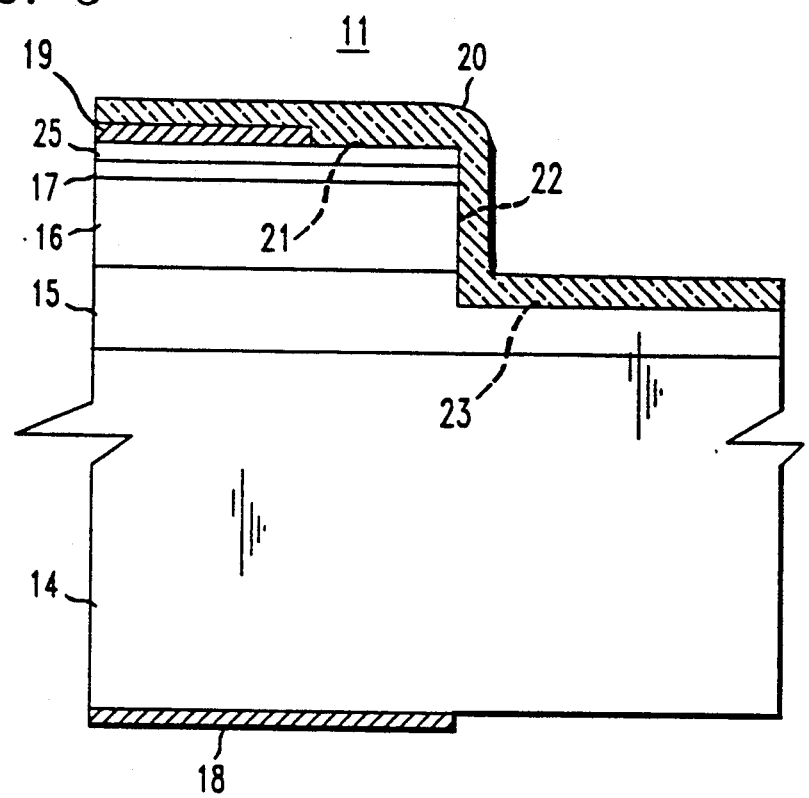
FIG. 3 is an enlarged schematic representation of a side view of a portion of a compound semiconductor structure with a thin $SiO_2$ layer thereon prior to formation of the microlens.

For illustration purposes, this invention is described with reference to an optical modulator waveguide, having an elliptical light mode with a ratio of, e.g. 1:3, as the semiconductor device 11. This device is coupled to an optical fiber by PEWE lens 12 fabricated from a photoresist material having refractive index (n=1.63) approximating that of the core (n=1.49-1.52) of the optical fiber. An effective fiber coupling efficiency of 80 percent with an order of magnitude relaxation of the typical alignment tolerances is obtainable with this arrangement Shown in FIG. 3 is an enlarged schematic representation of a section of a compound semiconductor wafer acting as a semiconductor substrate with a GaAs/AlGaAs device structure grown thereon by planar technology. In the exemplary embodiment device 11 is a modulator having a structure, including a 150 $\mu$m thick GaAs substrate 14, a 1.5 cm thick $Al_{0.4}Ga_{0.6}As$ bottom cladding layer 15, a 50 period GaAs/AlGaAs active region 16, each period including a 10 nm thick GaAs layer and a 10 nm thick $Al_{0.4}Ga_{0.6}As$ layer, a 0.3 $\mu$m thick $Al_{0.4}Ga_{0.6}As$ cladding layer 17, and a 50 nm thick GaAs capping layer, 25. The light emission takes place from the surface of a facet, 22, which is perpendicular to the plane of the drawing. The modulator is provided also with electrodes 18 and 19.

The modulator was prepared by depositing upon an about 500 $\mu$m thick GaAs wafer, to be used as substrate 14 of the modulator semiconductor, layers 15-17 and 25 in succession by planar technology deposition. The deposition may be carried out by molecular beam epitaxy (MME), metal organic vapor phase epitaxy (MOVPE), also known as metal organic chemical vapor deposition (MOCVD), or by hydride vapor phase epitaxy (VPE). In the present embodiment the deposition was carried out by MBE. Thereafter, the coated wafer was patterned with a photoresist mask so as to delineate, for trenches parallel to the face intended for light emission. The width of each trench, about 500 $\mu$m, was selected to produce two lenses, about 250 $\mu$m long each, arranged back to back, each to another. The wafer was then etched using a $SiCl_4$ plasma to totally remove in delineated trench areas layers 16, 17, and 25 and a small, about 0.5 $\mu$m, thickness of the upper surface of bottom cladding layer 15. This small thickness was chosen to allow the etched surface to be about 0.5 $\mu$m beneath the lower boundary of guiding or active region 16. Vertical walls were obtained by etching with plasma using 0.16 W/cm$^2$ RF power and 5 mTorr working pressure. The etched side walls were as smooth as the edge profile of the photoresist mask used for defining the trenches. The wafer was then thinned down to 150 $\mu$m, and 0.5 $\mu$m thick $SiO_2$ layer 20 was deposited at 300° C. by plasma enhanced chemical vapor deposition (PECVD) over the whole of the wafer, namely over top surface 21 of capping layer 25, the surface of facet 22 and the etched surface 23 of bottom cladding layer 15. The $SiO_2$ layer serves as the bottom cladding layer for the PEWE lens. Electrodes 18 and 19 may be deposited after the completion of the structure. Alternatively, the electrodes may be deposited after the deposition of $SiO_2$ layer 20. This would require formation of a window in layer 20 through which electrode 19 is then deposited.

Figure 4:
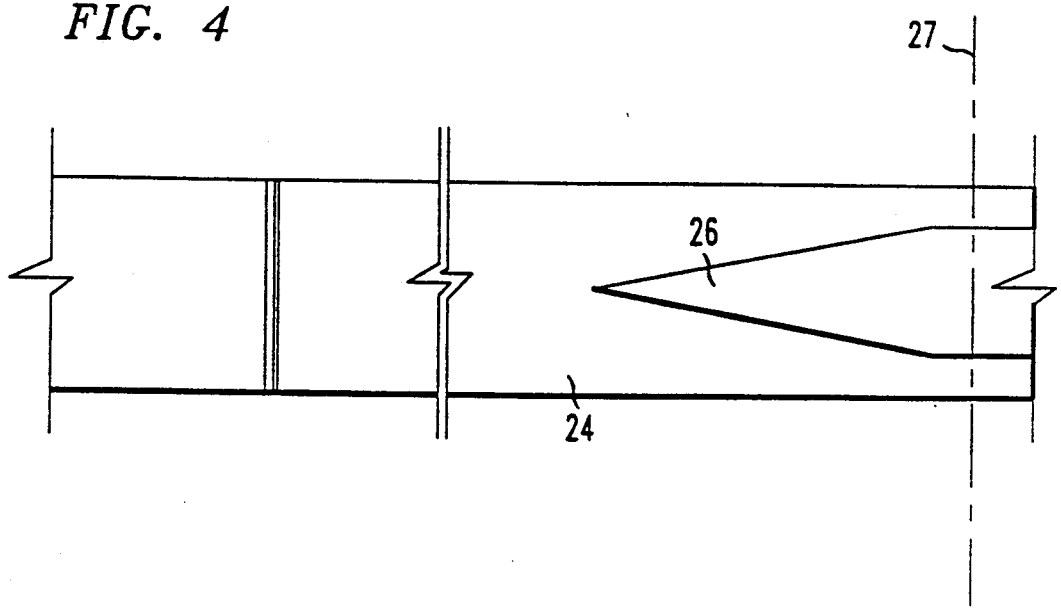
FIG. 4 is a top view of the structure of FIG. 3 with a diamond-like shaped photoresist region.

A 7 $\mu$m thick layer of AZ 4620 ® photoresist was applied by spinning over the $SiO_2$ coated surface of the wafer, and thereafter, elongated diamond-like-shaped photoresist areas 26 (FIG. 4) were patterned in the trenches centrally between the etched facets and with long apexes pointing in the direction of the facets. In FIG. 4, as well as in FIGS. 5-8, is shown a little more than one-half of the trench width and associated photoresists. The dash-and-dot line 27 represents the center of the trench and of photoresist ("diamond") area 26. Diamond 26 was from 10 to 50 $\mu$m wide in the central area and about 250 $\mu$m long which is about one-half the width of the trenches between the devices. This allots half of the length of the diamond (about 125 $\mu$m) to each of packages 10. Other dimensions of the diamond could be used as well so long as the width of the diamond exceeds the width of the area to be matched, e.g.,the diameter of the core of the optical fiber. The diamond was then post-baked at 120° C. for 15 minutes to evaporate most of the solvent. Thereafter 1 $\mu$m thick layer of AZ 4110 ® photoresist, 28, was spun on the wafer at rotation speeds ranging from 3,000 to 5,000 rpm, preferably at 4000 rpm. The two photoresists have similar solvent bases; however, the spinning of the AZ 4110 ® at higher rpms may partially smear out the diamond patterns. Spinning at lower rpms may lead to a thinner photoresist thickness. Alternatively, 1 $\mu$m thick photoresist could be sprayed on the whole of the surface, including the diamond pattern. In the production of optical packages with other devices, the active layer may have thickness and, thus, the height of the modal output area of the device, which is more or less than 1

μ. In such cases, the rpms should be adjusted to obtain a photoresist thickness matching that of the active layer.

The photoresists used in the specific example are commercially obtainable from Electronic Products Division of Hoechst Celanese Corporation. The AZ 4620® contains 2-Ethoxyethyl Acetate (111-15-9), xylenes (1330-20-7), n-butyl Acetate (123-86-41), Cresol Novolak Resin (9065-82-1) and Diazonaphto guinone sulfonic ester (5610-94-6). The AZ 4110° is of the same composition except for the Cresol Novolak Resin which is identified as being (117520-84-0). These resists are capable of being remelted and reflowed at temperatures of from 120 to 150° C. and have refractive indices approximating that of the core of the optical fiber. This temperature range is below the temperature e.g., 190° C., at which the device may be affected unfavorably. Other resists with similar characteristics may be also used. For example, the above resists may be replaced with commercially available resists, such as Shipley 1370° and 1195®, both of which contain propylene glycol monoethyl ether acetate (100-65-6).

Figure 5:
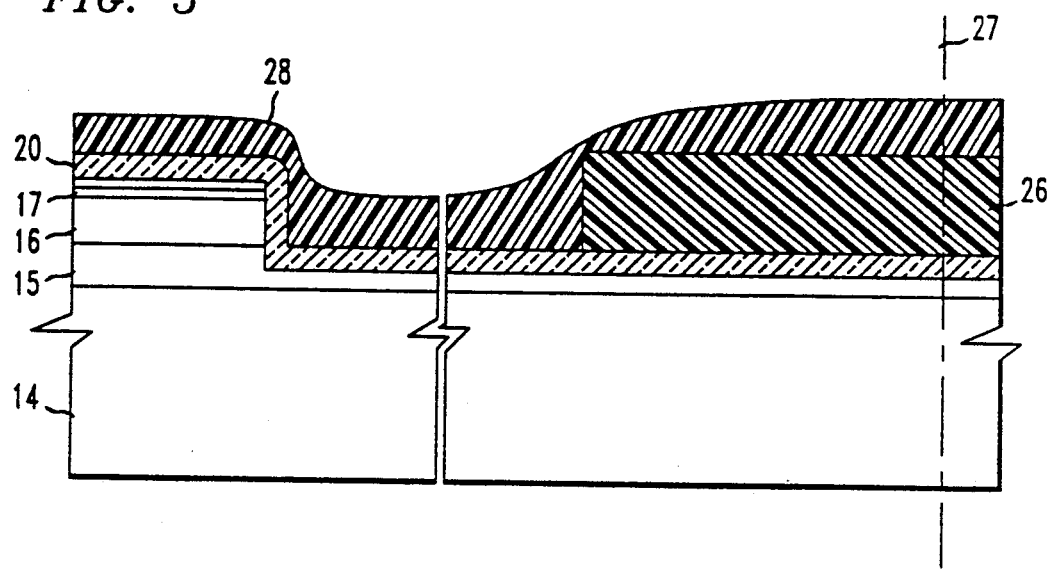
FIG. 5 is a schematic representation of a side view in cross-section of the structure of FIG. 4 with a continuous layer of photoresist over the whole of the upper area.
Figure 6:
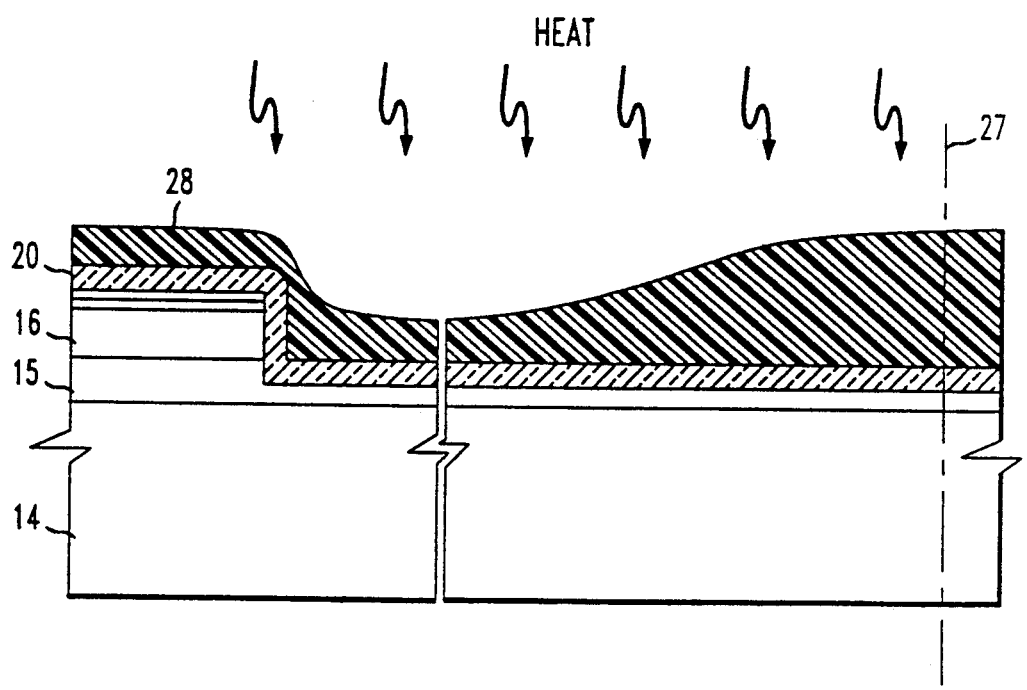
FIG. 6 is a schematic representation of the structure after the heating and reflow of the photoresists shown in FIG. 5.

The wafer was then baked at 120°-150° C. for one hour to allow the diamond shape to remelt and reflow forming a redistributed photoresist shape 28 as shown in FIG. 6. This reflow process resulted in a smooth adiabatic variation of the thickness of the photoresist The diamond pattern adjacent to the center of each diamond-shaped photoresist area 26 retained most of its original thickness (as shown in FIG. 5) of about 6–7 μm and a gradual decrease to 1 μm was observed toward the tip of the reflown diamond.

Figure 7:
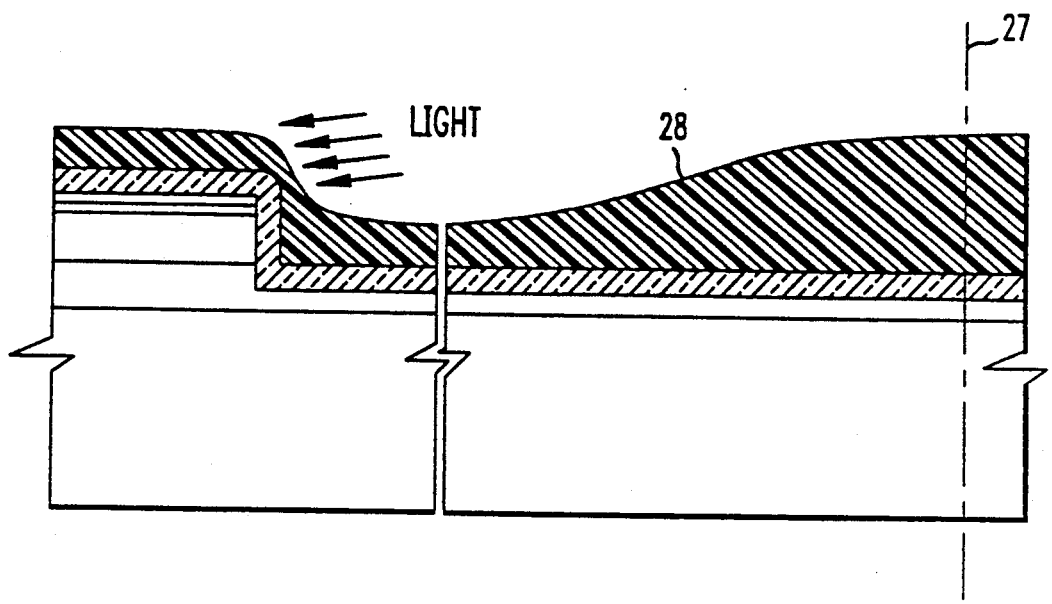
FIG. 7 is a schematic representation of an angle light exposure of an area of the photoresist to remove unwanted photoresist from an end portion of the microlens adjoining the device.
Figure 8:
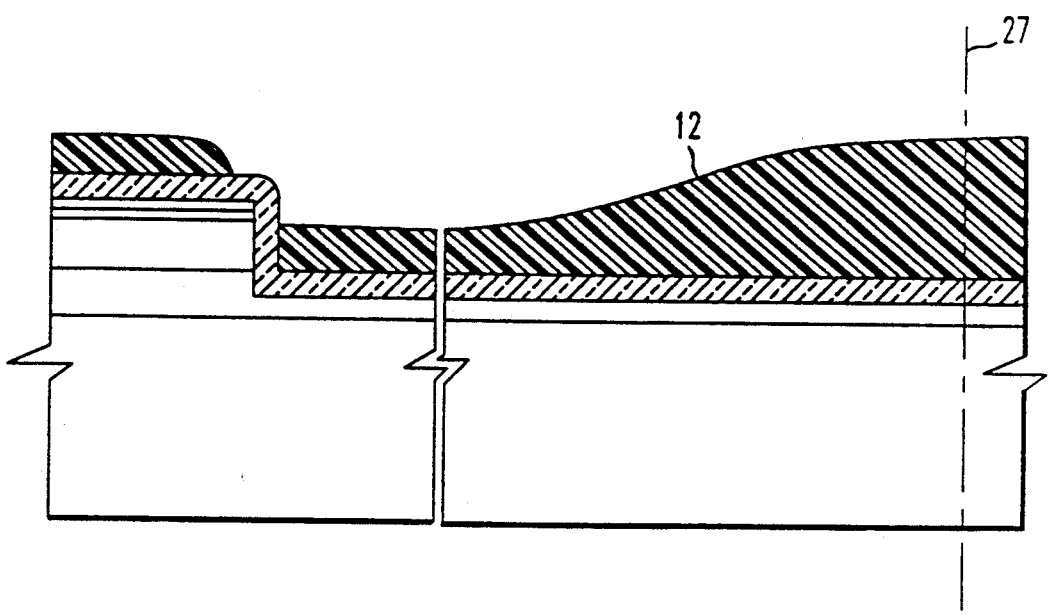
FIG. 8 shows the microlens after removal of the unwanted photoresist region and prior to separation of two adjoining lenses along the center line 27.

FIGS. 5 or 6 show a step coverage by the 1 μm photoresist over a corner joining the top surface of the device and the etched facet. At this region, the deposited photoresist expands to almost twice the 1 μm thickness. This type of junction between the polymeric guide and the semiconductor facet is undesirable. Optical fields conform to the adiabatic guide variations as long as the slope of the guide boundaries is small compared to the divergence of the beam at those points. Expansion of the photoresist layer near the facet to almost twice the desired thickness means that the optical field emanating from the active region will expand to the extent that the photoresist boundaries will allow. From FIG. 5 or 6 it is clear that about 50 percent of the power could be scattered away from the active area due to the mismatch of the aperture of the photoresist and semiconductor guide active region 16 at their intersection (i.e. the semiconductor guide is 1 μm thick whereas the photoresist at that point is about 2 μm thick.) To overcome this problem, an angle exposure technique was used: Output fight of an argon ion laser was filtered to provide 3 mW/cm$^2$ of optical flux at 450 nm. The sample was placed at a 5 degree angle tangent to the beam for 12 minutes. Because of the dependence of the Fresnel reflection and optical flux on the incident angle, the photoresist near the etched facets was primarily exposed as shown in FIG. 7. Since the optical field conforms to the photoresist boundaries, it is essential to calibrate the exposure and development times to retain ≈1 μm thickness of photoresist facing active region 16 at the etched facet. After development, the photoresist profile shown in FIG. 8 was obtained.

The device and the lens were then trimmed laterally by Reactive Ion Etching (RIE) to their final configurations, and the wafer was baked at 120°-150° C. to further smooth out the photoresist boundaries. The wafer was cleaved at center of the diamond patterns along the center line 27 and at some point in the device (modulator) structure insulting in integrated optical package 10 configuration shown in FIG. 1.

In the preferred embodiment, polymeric photoresist was used for the lens as described above. The resist had refractive index n=1.67 which approximated that of the fiber ($n_f$=1.49-1.53). The photoresist was used because of the ease of handling, treatment and fabrication. Instead of resists, other organic polymer materials may be used in preparing the waveguide lens. One of the materials suitable for this purpose is polyimide with refractive index n=1.6. The use of polyamide requires a somewhat different processing, as is described with reference to FIGS. 9 and 10.

Figure 9:
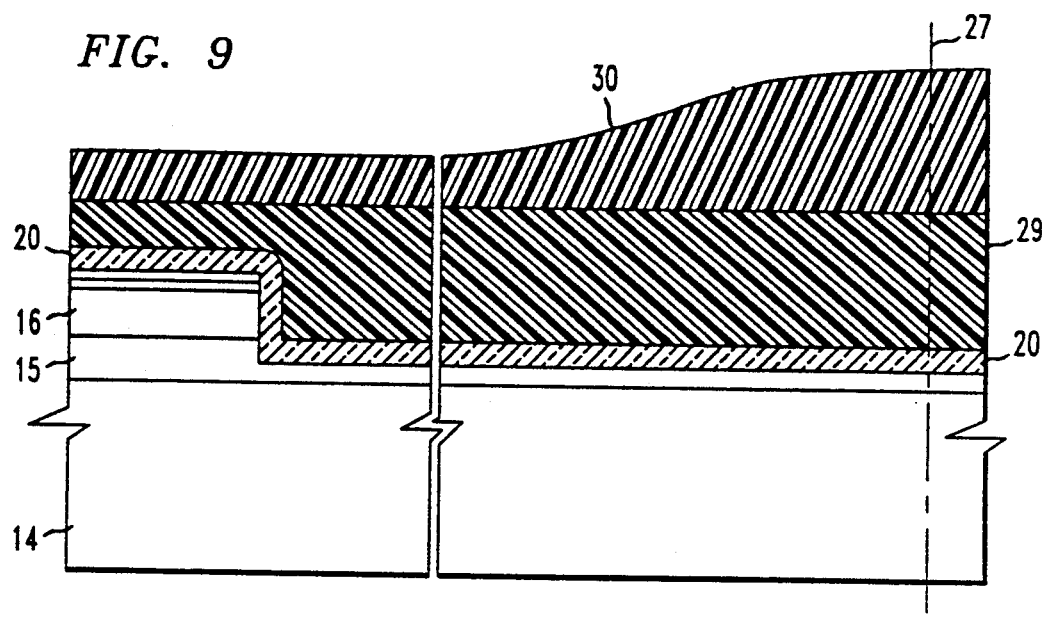
FIG. 9 is a schematic representation of an intermediate step in the formation of a polyamide microlens utilizing a reflown photoresist layer on top of the polymer layer.
Figure 10:
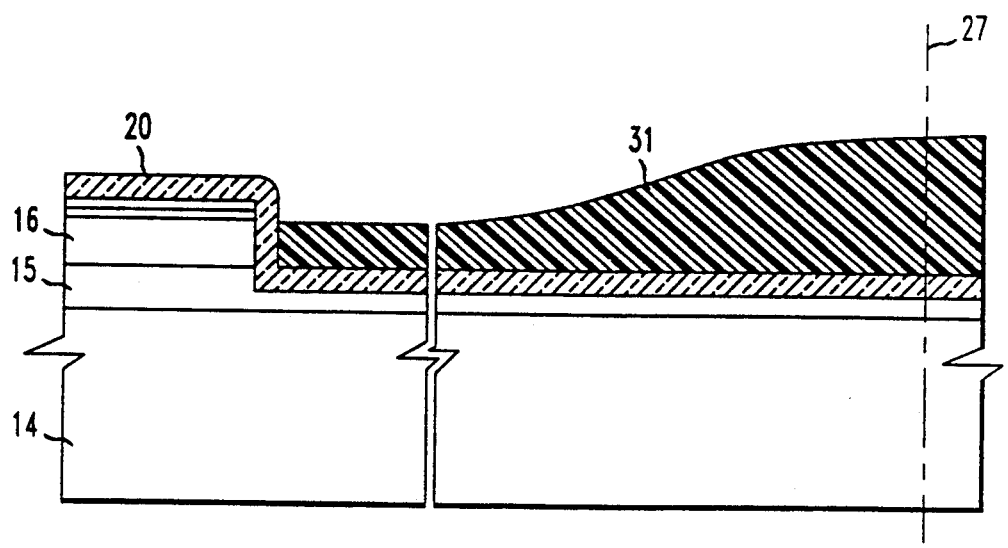
FIG. 10 is a schematic representation of the polyimide microlens formed from the configuration of FIG. 9.

Beginning with a wafer processed up to and including dielectric layer 20 (FIG. 3), a 6–7 μm thick layer of polyimide, 29, is deposited on top of dielectric layer 20 (FIG. 9). Thereafter, photoresist deposition, patterning and treatment, as disclosed above with reference to FIGS. 4–6, are conducted on top of polyimide layer 29, resulting in the photoresist profile, 30, (FIG. 9). This photoresist profile is similar to that shown in FIG. 6, except for the thickened coverage of the juncture between facet 22 and to surface 21 of device 11. Subsequently, the photoresist and underlying polyimide are subjected to dry etching in $O_2$ plasma (3 sccm $O_2$ flow, 100 W RF power, 430 V DC bias, with etching rate of about 70 nm/min). The etching rates of photoresist and polyamide are substantially identical; therefore, photoresist profile 30 is transferred to the polyamide, leading to a lens profile, 31, shown in FIG. 10.

Eighty percent coupling efficiency between an optical fiber to semiconductor waveguide with an asymmetric modal output area was achieved using a PEWE lens produced using organic polymeric materials, such as photoresists. In the exemplary embodiment, the semiconductor guide was a modulator structure. Similar coupling efficiencies should be achievable with laser diodes, photodetectors, semiconductor optical switches or other structures having asymmetric modal output (or input) areas. For better thermal stability, the PEWE lens process may incorporate polyimide films.

The measurement of the enhancement of fiber coupling due to the PEWE lens was determined using slab waveguide geometry and incident power of a ND:YAG laser. From the observation of the near field pattern on the output modulator facet, all of the light was coupled into the fundamental mode of the semiconductor guide. An indirect measure of the improvement in coupling efficiency was observed from the second harmonic signal radiating from the end facet of the modulator guide. With the same ND:YAG incident power, radiated green light from the modulator end facet was much brighter for the devices containing PEWE lenses compared to the guides without these lenses. In addition to the large coupling efficiencies, it was possible to easily couple light into the guide and maintain it for long periods of time. This is due to the large PEWE input aperture which has roughly the same dimensions as the core of a single mode fiber.

Additional advantages and modifications will readily occur to those skilled in the art Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

We claim:

1. A method of fabricating an integrated optical package, said package comprising an optical device with an asymmetric modal area and an elongated lens for coupling the device to an optical component having large modal area relative to said asymmetric modal area, which comprises:

beginning with a substrate having a compound semiconductor structure thereon comprising an active layer and a bottom and a top cladding layers, etching a trench in said structure so as to expose a facet of a device on each side of the trench, said etching removing a modal thickness of the lower cladding layer and all of the other layers of the structure above said lower cladding layer while refilling those portions of said structure which are intended to be used as the optical device, forming in said trench centrally between two facets a diamond-shaped elevated form the length of which is equal to a half of the width of the trench between the facets, the thickness of the diamond shaped form being equivalent to at least the diameter of the core of a fiber to be optically coupled to the device, coating the whole of the structure with a thin layer of a polymeric material in a thickness equivalent to the height of the active layer in said device, converting the profile of the combined polymeric material to a profile with a gentle slope between said center portion and said facet-adjoining portion, and removing an excess of thickness of said polymeric material adjacent each facet so as to reduce this thickness to that corresponding to the height of the active layer in said device.

2. The method of claim 1, in which said polymeric material is a polymeric photoresist capable of remelt and reflow at temperatures below about 190° C., and heating the combined polymeric material so as to cause remelt and reflow of said polymeric material into a profile with a slope.

3. The method of claim 1, in which said hearing is conducted at temperatures within a range of from 120° C. to 150° C.

4. The method of claim 1, in which said polymeric material comprises polyimide.

5. The method of claim 4, in which said slope of the profile is transmitted to the polyimide material by depositing polyamide in a thickness corresponding to the wide cross-section of the lens, forming on top of the polyamide layer a wedge-like shape of said photoresist, said forming including deposition of diamond-shaped elevated form of photoresist on top of the polyamide layer, deposition of a dun coating of photoresist over the whole of the structure and heating the resultant resist assembly to obtain a gentle slope in the profile of the photoresist, and etching the photoresist and polyamide assembly in a plasma so as to transfer the photoresist profile to the polyamide.

* * * * *